United States Patent
Kang et al.

(10) Patent No.: US 9,118,086 B2
(45) Date of Patent: Aug. 25, 2015

(54) ELECTROLYTE FOR LITHIUM SECONDARY BATTERY AND LITHIUM SECONDARY BATTERY INCLUDING THE SAME

(75) Inventors: Yoon-sok Kang, Yongin-si (KR); Seok-soo Lee, Yongin-si (KR); Won-chang Choi, Yongin-si (KR); Jin-hwan Park, Yongin-si (KR); Mi-jeong Song, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 120 days.

(21) Appl. No.: 13/338,488

(22) Filed: Dec. 28, 2011

(65) Prior Publication Data

US 2012/0171563 A1    Jul. 5, 2012

(30) Foreign Application Priority Data

Dec. 30, 2010    (KR) .................. 10-2010-0139344

(51) Int. Cl.
| | |
|---|---|
| *H01M 10/26* | (2006.01) |
| *H01M 10/052* | (2010.01) |
| *H01M 10/058* | (2010.01) |
| *H01M 10/0567* | (2010.01) |

(52) U.S. Cl.
CPC .......... *H01M 10/052* (2013.01); *H01M 10/058* (2013.01); *H01M 10/0567* (2013.01); *H01M 10/26* (2013.01); *Y02E 60/122* (2013.01); *Y02T 10/7011* (2013.01)

(58) Field of Classification Search
CPC ...................................... H01M 10/26
USPC ............ 429/330, 199, 342, 348, 140
See application file for complete search history.

(56) References Cited

U.S. PATENT DOCUMENTS

| | | | |
|---|---|---|---|
| 7,014,954 B2 * | 3/2006 | Yamaguchi et al. | 429/330 |
| 2002/0037458 A1 * | 3/2002 | Yamaguchi et al. | 429/338 |
| 2003/0073002 A1 * | 4/2003 | Imachi et al. | 429/231.3 |

(Continued)

FOREIGN PATENT DOCUMENTS

| | | | |
|---|---|---|---|
| EP | 1 160 905 A2 | 12/2001 | |
| JP | 54007134 | * | 1/1979 |

(Continued)

OTHER PUBLICATIONS

CAS Abstract of JP 54007134 to Yasuda.*

(Continued)

*Primary Examiner* — Patrick Ryan
*Assistant Examiner* — Alex Usyatinsky
(74) *Attorney, Agent, or Firm* — Cantor Colburn LLP

(57) ABSTRACT

An electrolyte for a lithium secondary battery, which includes a lithium salt, a nonaqueous organic solvent and at least one additive selected from the group consisting of vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), ascorbyl palmitate, and sodium ascorbate.

15 Claims, 9 Drawing Sheets

(56) References Cited

U.S. PATENT DOCUMENTS

2005/0196671 A1 9/2005 Paonessa et al.
2010/0255382 A1* 10/2010 Kim et al. .................. 429/247

FOREIGN PATENT DOCUMENTS

| | | |
|---|---|---|
| JP | 2000-21444 | 1/2000 |
| JP | 2001283906 A | 10/2001 |
| JP | 2005-294140 | 10/2005 |
| JP | 3959774 | 5/2007 |
| KR | 1020100065778 A | 6/2010 |

OTHER PUBLICATIONS

What Is Sodium Ascorbate? Jul. 7, 2010.*

Extended European Search Report for Application No. 11195929.2-1227 dated Apr. 18, 2012.

Sheng Shui Zhang, A review on electrolyte additives for lithium-ion batteries, ScienceDirect Journal of Power Sources 162 (2006) pp. 1379-1394.

English language abstract—Patent Abstracts of Japan—10-247517.

Koji Abe et al., "Functional Electrolyte: Additives for Improving the Cyclability of Cathode Materials", *Electrochemical and Solid-State Letters*, 7 (12) A462-A465 (2004).

Korean Office Action with English Translation for Application No. 10-2010-0139344 dated Jan. 30, 2013.

Ramalingaiah, et al., "Os(VIII)-catalyzed and uncatalyzed oxidation of biotin by chloramine-T in alkaline medium: Comparative mechanistic aspects and kinetic modeling", Journal of Molecular Catalysis A: Chemical 265 (2007) pp. 70-79.

* cited by examiner

ELECTROLYTE FOR LITHIUM SECONDARY BATTERY AND LITHIUM SECONDARY BATTERY INCLUDING THE SAME

CROSS-REFERENCE TO RELATED APPLICATION

This application claims the benefit of Korean Patent Application No. 10-2010-0139344, filed on Dec. 30, 2010 in the Korean Intellectual Property Office, the disclosure of which is incorporated herein by reference.

BACKGROUND OF THE INVENTION

1. Field of the Invention

Aspects of the present invention relate to electrolytes for lithium secondary batteries and lithium secondary batteries including the electrolyte, and more particularly, to an electrolyte for a lithium secondary battery and a lithium secondary battery including the electrolyte that may improve lifetime characteristics and high-temperature durability characteristics of the lithium secondary battery.

2. Description of the Related Art

Typical rechargeable secondary batteries include lead storage batteries, nickel-hydrogen batteries, and lithium secondary batteries. The lithium secondary batteries, due to the nature of lithium, which is the lightest metal in the periodic table, have a high energy density per unit weight and an electromotive force of 4 V, which is three times as high as that of nickel-based batteries, and thus may be manufactured smaller. The lithium secondary batteries have no memory effect with reduced energy capacity even when charged in an incompletely discharged state. Due to these characteristics, lithium secondary batteries have been extensively used in devices such as mobile products, laptop computers, and electric tools. Lithium secondary batteries are expected to be available as major power sources for electric vehicles and power storage.

A lithium secondary battery includes a cathode, an anode, a separator, and an electrolyte. Lithium ions are separated from the cathode and migrate to the anode during charging, while the lithium ions are separated from the anode and migrate back to the cathode during discharging.

The electrolyte, which is one of the main elements of the lithium secondary battery, may serve as a migration medium (conductor) of lithium ions that are generated from electrochemical reactions in the cathode and the anode. The electrolyte may consist of a lithium salt and an organic solvent. The electrolyte of the lithium secondary battery is typically a non-aqueous system, which may be used to generate a high voltage due to a wide electrochemical stability window, even though it has low conductivity.

With the secondary battery market expanding into electric vehicle and power storage markets, lithium secondary batteries are adopting novel electrode active materials that ensure high energy density. However, the use of a low-potential anode active material and a high-potential cathode active material to increase the energy density has caused the electrolyte to be vulnerable to decomposition at the surface of the cathode and anode due to a narrowed potential window of the electrolyte relative to the active materials.

In a graphite anode, use of an appropriate electrolyte or an electrolyte additive is known to form a film on the surface of an anode active material during initial charging, which prevents the anode active material from directly contacting the electrolyte that would decompose the electrolyte. In a cathode, an electrolyte additive is known to work as an overcharging inhibitor by forming a thick film on the surface of the cathode when the voltage of the battery rises over a specific voltage, thus blocking passage of lithium ions and stopping operation of the battery.

With the recent use of cathode active materials possessing high voltage characteristics, there has been a growing demand for forming thin protective films on the cathodes. In this regard, research has shown that a thin film formed on the surface of a cathode by adding an overcharging inhibitor in a low concentration improves the lifetime of a battery (Electrochemical and Solid-State Letters, 7(12) A462-A465 (2004)). However, this thin film is non-polar, and thus hinders passage of lithium ions, adversely affecting battery characteristics.

Batteries for electric vehicles and power storage are more likely to be exposed to high-temperature environments, and the temperatures of the batteries are apt to rise during periods of instantaneous charging and discharging. Thus, these batteries need to operate normally at high temperatures. However, chemical activity of the electrolyte increases at high temperatures, causing unwanted additional chemical reactions, such as self-discharging, to occur.

SUMMARY OF THE INVENTION

Aspects of the present invention provide electrolytes for lithium secondary batteries that resist oxidation on the surface of a cathode or that decompose in high-temperature conditions.

Aspects of the present invention provide lithium secondary batteries having good lifetime characteristics and good high-temperature preservation characteristics due to the use of the electrolytes that are resistant to oxidation or decomposition.

According to an aspect of the present invention, an electrolyte for a lithium secondary battery includes: a lithium salt; a nonaqueous organic solvent; and an additive. The additive may include at least one compound selected from the group consisting of vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), palmitoyl ascorbic acid (ascorbyl palmitate), and sodium ascorbic acid (sodium ascorbate).

The additive may include at least one substituent selected from the group consisting of an alkyl group, an alkoxy group, an ethylene oxide group, an alkylthio group, an ether group, an ester group, a hydroxyl group, an amine group, a thiol group, a ketone group, an epoxy group, a fluoro group, a chloro group, and a bromo group.

The amount of the additive may be in a range of about 0.005 wt % to about 5 wt % based on the total weight of the electrolyte.

The lithium salt may include $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_xF_{2y+1}SO_2)$ (where x and y are each a natural number), LiF, LiBr, LiCl, LiI, $LiB(C_2O_4)_2$ (lithium bis(oxalato) borate or LiBOB), or a combination thereof.

The nonaqueous organic solvent may include a carbonate-based solvent, an ester-based solvent, an ether-based solvent, a ketone-based solvent, an alcohol-based solvent, an aprotic solvent, or a combination thereof.

According to another aspect of the present invention, a lithium secondary battery includes: a cathode including a cathode active material that allows intercalation and deintercalation of lithium; an anode including an anode active material that allows intercalation and deintercalation of lithium;

and an electrolyte filled between the cathode and the anode. The electrolyte may include a lithium salt, a nonaqueous organic solvent, and at least one additive selected from the group consisting of vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), ascorbyl palmitate, and sodium ascorbate.

The cathode may include a thin film on a surface thereof, and the thin film is derived from a part of the at least one additive or the entire of the at least one additive in the electrolyte.

The thin film may have a thickness of about 0.05 nm to about 100 nm.

The cathode active material may include at least one compound selected from the group consisting of $LiCoO_2$, $LiNi_{1-x}Co_xO_2$ ($0 \leq x<1$), $Li_{1-x}M_xO_2$ (wherein M is Mn or Fe, and $0.03<x<0.1$), $Li[Ni_xCo_{1-2x}Mn_x]O_2$ ($0<x<0.5$), $Li[Ni_xMn_x]O_2$ ($0<x\leq0.5$), $Li_{1+x}(Ni,Co,Mn)_{1-y}O_z$ ($0<x\leq1$, $0\leq y<1$, and $2\leq z\leq 4$), $LiM_2O_4$ (wherein M is Ti, V, or Mn), $LiM_xMn_{2-x}O_4$ (wherein M is a transition metal, and $0<x<1$), $LiFePO_4$, $LiMPO_4$ (wherein M is Mn, Co, or Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (wherein M is a transition metal, and X is S, P, As, Mo, or W), and $Li_3M_2(PO_4)_3$ (wherein M is Fe, V, or Ti).

The cathode active material may have an operating voltage of about 5 V. The cathode active material may include $Li_{1+x}(Ni,Co,Mn)_{1-x}O_2$ ($0.05 \leq x \leq 0.2$) or $LiNi_{0.5}Mn_{1.5}O_4$.

The anode active material may include at least one material selected from the group consisting of a vanadium oxide, a lithium vanadium oxide, silicon (Si), $SiO_x$ ($0<x<2$), a Si-T alloy (wherein T is selected from the group consisting of magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and combinations thereof), graphite, soft carbon, hard carbon, mesophase pitch carbide, and sintered coke.

The lithium secondary battery may further include a separator between the cathode and the anode, the separator electrically insulating the cathode and the anode from each other.

Additional aspects and/or advantages of the invention will be set forth in part in the description which follows and, in part, will be apparent from the description, or may be learned by practice of the presented embodiments.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
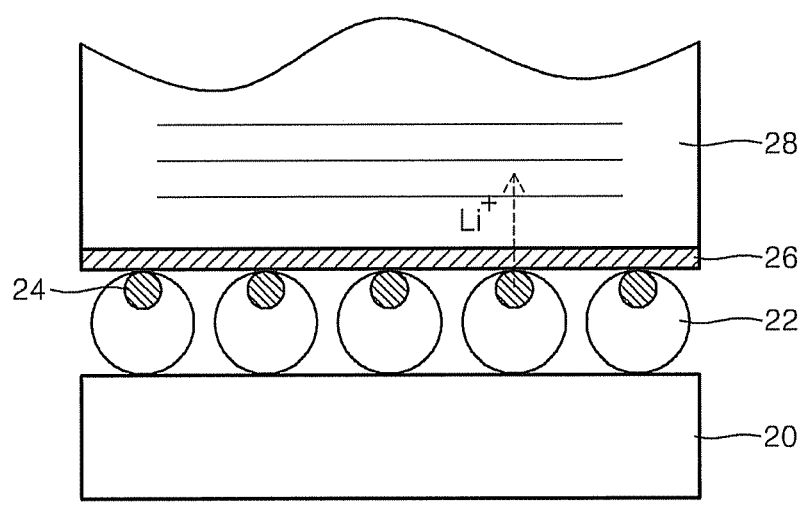
FIG. 1 is a schematic cross-sectional view illustrating a thin film formed on a surface of a cathode of a lithium secondary battery, according to an exemplary embodiment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an exemplary embodiment of the present invention, an electrolyte for a lithium secondary battery includes a lithium salt, a non-aqueous organic solvent, and an additive, wherein the additive may include at least one compound selected from among vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), ascorbyl palmitate, and sodium ascorbate. These vitamin compounds may be available as antioxidants.

The vitamin compounds may have the following formulae.

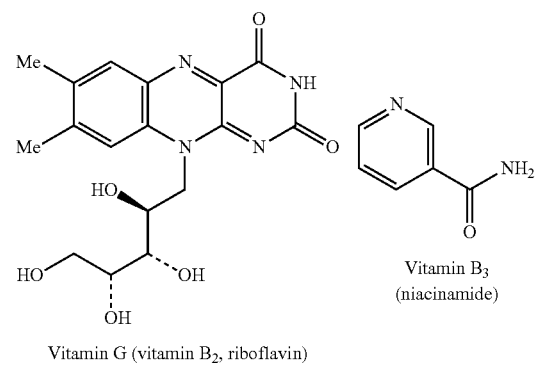

Vitamin G (vitamin $B_2$, riboflavin)

Vitamin $B_3$ (niacinamide)

-continued

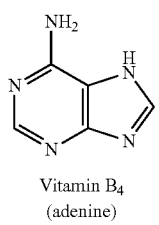

Vitamin B₄
(adenine)

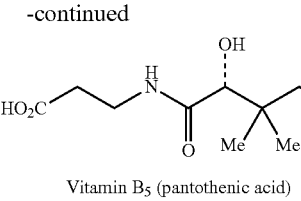

Vitamin B₅ (pantothenic acid)

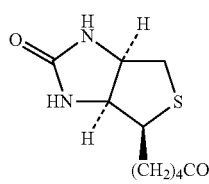

Vitamin H (vitamin B₇, biotin),

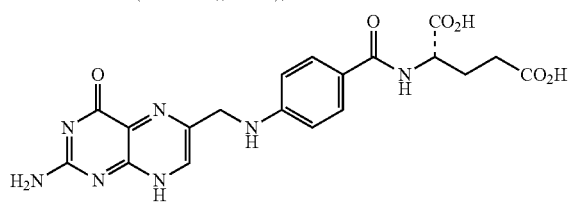

Vitamin M (vitamin B₉, folic acid)

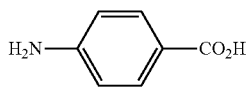

Vitamin B$_x$
(4-aminobenzoic acid)

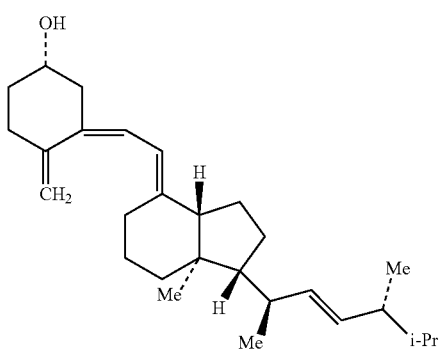

Vitamin D₂ (ergocalciferol)

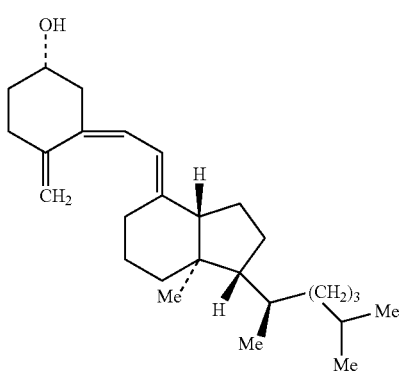

Vitamin D₃ (cholecalciferol)

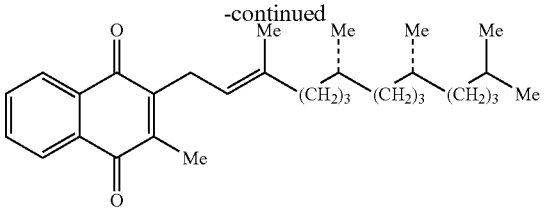

Vitamin K₁ (phylloquinone)

The vitamin compounds may have at least one substituent selected from among an alkyl group, an alkoxy group, an alkylene oxide group, an alkylthio group, an ether group, an ester group, a hydroxy group, an amine group, a thiol group, a ketone group, an epoxy group, a fluoro group, a chloro group, and a bromo group. The vitamin compounds may form a salt with an alkali metal or an alkali earth metal.

The alkyl group used herein may be a substituted or unsubstituted $C_1$-$C_{20}$ alkyl group. Examples of the alkyl group used herein include isomers of methyl, ethyl, propyl, butyl, pentyl, hexyl, and the like.

The alkoxy group used herein may be a substituted or unsubstituted $C_1$-$C_{20}$ alkoxy group. Examples of the alkoxy group include methoxy, ethoxy, propoxy, and the like.

The alkylene oxide group used herein may be a substituted or unsubstituted $C_2$-$C_{20}$ alkylene oxide group. Examples of the alkylene group include ethylene oxide, propylene oxide, butylene oxide, hexylene oxide, and the like.

The alkylthio group used herein may be a substituted or unsubstituted $C_1$-$C_{20}$ alkylthio group. Examples of the alkylthio group include methylthio, ethylthio, and the like.

The ether group used herein may be a substituted or unsubstituted $C_2$-$C_{20}$ ether group. Examples of the ether group include dimethyl ether, diethyl ether, tetrahydrofuran, dioxane, and the like.

The ester group used herein may be a substituted or unsubstituted $C_2$-$C_{20}$ ester group. Examples of the ester group include palmitoyl, and the like.

The amine group used herein may be a substituted or unsubstituted $C_1$-$C_{20}$ amine group. Examples of the amine group include methyl amine, ethyl amine, propyl amine, and the like.

The ketone group used herein may be a substituted or unsubstituted $C_1$-$C_{20}$ ketone group. Examples of the ketone group include formyl, acetyl, propionyl, and the like.

The epoxy group used herein may be a substituted or unsubstituted $C_2$-$C_{20}$ epoxy group. Examples of the epoxy group include glycidyl, and the like.

The term "substituted" in the wording "substituted or unsubstituted" indicates substitution with a halogen atom, a $C_1$-$C_{10}$ alkyl group substituted with a halogen atom (for example, $CCF_3$, $CHCF_2$, $CH_2F$, $CCl_3$, and the like), a hydroxyl group, a nitro group, a cyano group, an amino group, an amidino group, hydrazine, hydrazone, a carboxyl group or a salt thereof, a sulfonic acid group or a salt thereof, a phosphoric acid or a salt thereof, a $C_1$-$C_{10}$ alkyl group, a $C_2$-$C_{10}$ alkenyl group, a $C_2$-$C_{10}$ alkynyl group, or a $C_1$-$C_{10}$ heteroalkyl group.

The amount of these vitamin compounds used as the additive may range from about 0.005 wt % to about 5 wt %, and in some embodiments, may be about 0.05 wt % or 0.1 wt %, based on the total weight of the electrolyte.

If the amount of the additive is greater than 5 wt %, the resulting film may be so thick that lithium ions cannot pass through it. If the amount of the additive is less than 0.005 wt %, the effect of the film may be negligible.

Vitamins are known to oxidize by reaction with various sorts of highly oxidative radicals that are produced as byproducts from oxidation in the body, causing the radicals to become inactivated. That is, vitamins may protect body cells by self-oxidation.

The electrolyte of a lithium secondary battery acts as a path for lithium ions. Accordingly, if the electrolyte is oxidized or reduced during charging and discharging, the charging and discharging performance of the battery may be impaired. The vitamin compounds may protect the electrolyte by oxidizing instead of the electrolyte of the lithium secondary battery, similar to the way vitamins oxidize in the body.

In particular, the vitamin compounds may oxidize on the surface of the cathode during initial charging and discharging, forming a thin film. The thin film formed on the surface of the cathode blocks a cathode active material from directly contacting the electrolyte, thereby preventing the electrolyte from oxidizing on the surface of the cathode, and the charging and discharging performance from deteriorating. The thin film formed on the surface of the cathode may allow only lithium ions to pass through, but not electrons.

The thin film formed on the surface of the cathode may have a thickness of about 0.05 nm to about 100 nm, and in some embodiments, may have a thickness of about 0.1 nm to about 80 nm, and in some other embodiments, may have a thickness of about 0.5 nm to about 50 nm. When the thickness of the thin film is within these ranges, the thin film may not adversely affect transfer of lithium ions, and may effectively prevent oxidation of the electrolyte on the surface of the cathode.

Instead of the electrolyte, the vitamin compounds may be oxidized by radicals that are readily generated during high-temperature and high-voltage charging and discharging, thereby protecting the electrolyte.

The non-aqueous organic solvent, which is in the electrolyte of a lithium secondary battery, may serve as a migration medium for ions involved in electrochemical reactions in the battery. Any suitable non-aqueous organic solvent that is commonly used in the art may be used. Examples of the nonaqueous organic solvent include a carbonate-based solvent, an ester-based solvent, an ether-based solvent, a ketone-based solvent, an alcohol-based solvent, an aprotic solvent, and a combination thereof.

Examples of the carbonate-based solvent include dimethyl carbonate (DMC), diethyl carbonate (DEC), dipropyl carbonate (DPC), methylpropyl carbonate (MPC), ethylpropyl carbonate (EPC), ethyl methyl carbonate (methylethyl carbonate, EMC, MEC), ethylene carbonate (EC), propylene carbonate (PC), butylene carbonate (BC), and the like.

Examples of the ester-based solvent include methyl acetate, ethyl acetate, n-propyl acetate, t-butyl acetate, methyl propionate (MP), ethyl propionate, γ-butyrolactone, 5-decanolide, γ-valerolactone, dl-mevalonolactone, γ-caprolactone, and the like.

Examples of the ether-based solvent include dibutyl ether, tetraglyme, diglyme, dimethoxyethane, 2-methyltetrahydrofuran, tetrahydrofuran (THF), and the like.

Examples of the ketone-based solvent include cyclohexanone and the like.

Examples of the alcohol-based solvent include ethyl alcohol, isopropyl alcohol, and the like.

Examples of the aprotic solvent include nitriles (such as R—CN, wherein R is a $C_2$-$C_{20}$ linear, branched, or cyclic hydrocarbon-based moiety that may include a double-bond, aromatic ring or an ether bond), amides (such as dimethylformamide), dioxolanes (such as 1,3-dioxolane), and sulfolanes.

One of the nonaqueous organic solvents may be used alone. Alternatively, at least two of the nonaqueous organic solvents may be used in combination. In this case, a mixing ratio of the at least two nonaqueous organic solvents may appropriately vary according to the desired performance of the battery, which can be determined by one of ordinary skill in the art.

The carbonate-based solvent may include a combination of cyclic carbonate and linear carbonate. For example, a combination of cyclic carbonate and linear carbonate in a volume ratio of about 1:1 to about 1:9 may be used.

The nonaqueous organic solvent may further include an aromatic hydrocarbon-based organic solvent in the carbonate-based solvent. The carbonate-based solvent and the aromatic hydrocarbon-based organic solvent may be mixed, for example, in a volume ratio of about 1:1 to about 30:1.

An example of the aromatic hydrocarbon-based organic solvent is an aromatic hydrocarbon-based compound represented by Formula I below:

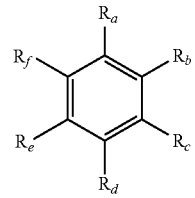

Formula 1

In Formula I above, $R_a$ to $R_f$ are each independently a hydrogen atom, a halogen atom, a $C_1$-$C_{10}$ alkyl group, a haloalkyl group, or a combination thereof.

Examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, 2-fluorotoluene, 2,3-difluorotoluene, 2,4-difluorotoluene, 2,5-difluorotoluene, 2,3,4-trifluorotoluene, 2,3,5-trifluorotoluene, 2-chlorotoluene, 2,3-dichlorotoluene, 2,4-dichlorotoluene, 2,5-dichlorotoluene, 2,3,4-trichlorotoluene, 2,3,5-trichlorotoluene, 2-iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The lithium salt, which is in the electrolyte of a lithium secondary battery may dissolve in the organic solvent, and serves as a lithium ion source in the battery to enable basic operation of the lithium secondary battery. The lithium salt may be any suitable lithium salt that is commonly used for lithium batteries. Examples of the lithium salt for the non-aqueous electrolyte include $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_yF_{2y+1}SO_2)$ (where x and y are each a natural number), LiF, LiBr, LiCl, LiI, and $LiB(C_2O_4)_2$ (lithium bis(oxalato) borate or LiBOB), and combinations thereof. These lithium salts may be used as a supporting electrolytic salt.

The concentration of the lithium salt may be within a range commonly applied in the art. The concentration of the lithium salt is not specifically limited, and in some embodiments, may be in a range of about 0.1 M to about 2.0 M in the electrolyte. When the concentration of the lithium salt is within this range, the concentration of the electrolyte may be appropriately maintained to have improved performance, and the viscosity of the electrolyte may be appropriately maintained to improve mobility of lithium ions.

Hereinafter, embodiments of a lithium secondary battery including the electrolytes described above will be described in detail.

According to an exemplary embodiment of the present invention, a lithium secondary battery may include a cathode, an anode, and an electrolyte, wherein the electrolyte includes a lithium salt, and a nonaqueous organic solvent, and an additive including at least one compound selected from among vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), ascorbyl palmitate, and sodium ascorbate.

According to another exemplary embodiment, a lithium secondary battery may include a cathode, an anode, and an electrolyte, wherein the electrolyte includes a lithium salt, and a nonaqueous organic solvent, and an additive including at least one compound selected from among vitamin G (vitamin $B_2$, riboflavin), vitamin $B_3$ (niacinamide), vitamin $B_4$ (adenine), vitamin $B_5$ (pantothenic acid), vitamin H (vitamin $B_7$, biotin), vitamin M (vitamin $B_9$, folic acid), vitamin $B_X$ (4-aminobenzoic acid), vitamin $D_2$ (ergocalciferol), vitamin $D_3$ (cholecalciferol), vitamin $K_1$ (phylloquinone), ascorbyl palmitate, and sodium ascorbate; and the cathode includes a thin film on a surface thereof that is derived from a part of the additive or the entire additive.

According to this embodiment, the thin film may be formed on the cathode during initial charging of the lithium secondary battery by partial or total oxidation (decomposition) of the additive contained in the electrolyte. As a result, the lithium secondary battery may have good capacity retention characteristics even when charged to a high voltage of over 4.3V, and may have good lifetime characteristics and good capacity retention characteristics in high temperature conditions.

The thin film formed on the surface of the cathode may have a thickness of about 0.05 nm to about 100 nm, and in some embodiments, may have a thickness of about 0.1 nm to about 80 nm, and in some other embodiments, may have a thickness of about 0.5 nm to about 50 nm. When the thickness of the thin film is within these ranges, the thin film may not adversely affect transfer of lithium ions and may effectively prevent oxidation of the electrolyte on the surface of the cathode.

FIG. 1 is a schematic cross-sectional view illustrating a thin film formed on a surface of a cathode of a lithium secondary battery, according to an exemplary embodiment. Referring to FIG. 1, a thin film 26 is formed on surfaces of cathode active material 22 applied to a cathode current collector 20. As illustrated in FIG. 1, lithium ions 24 may be effectively transferred from the cathode to the electrolyte 28.

Figure 2:
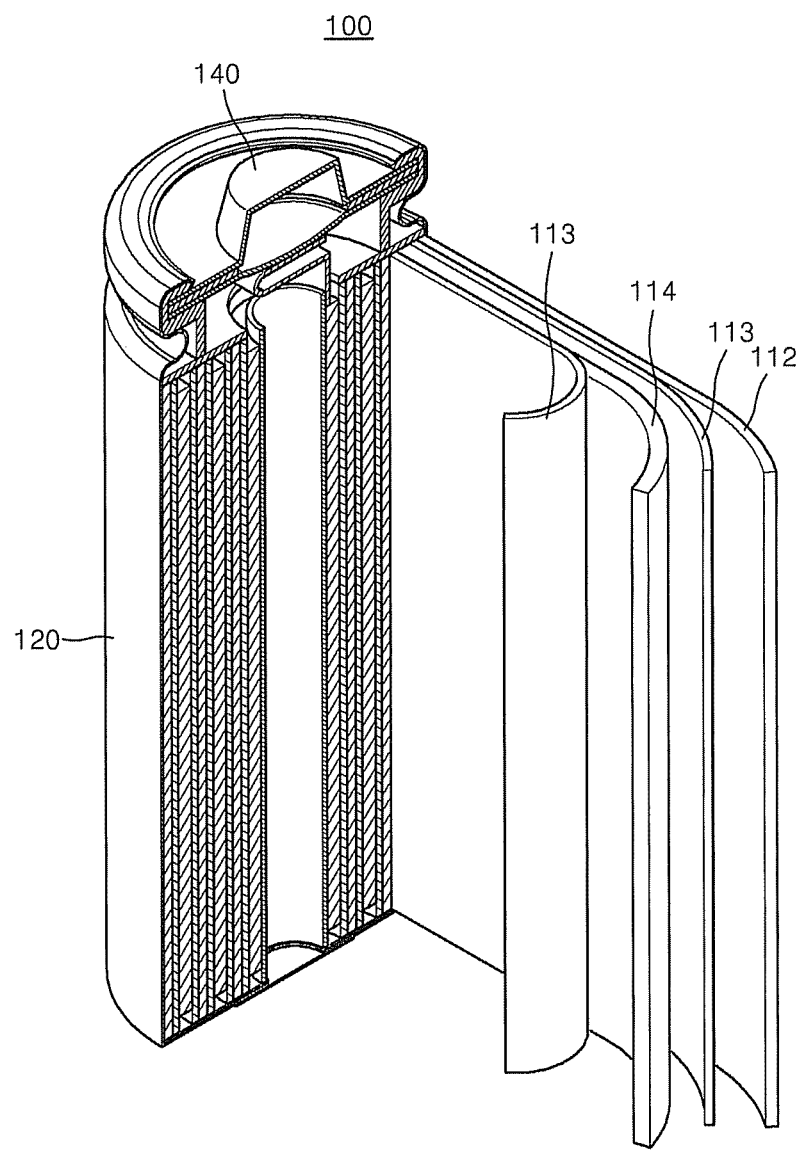
FIG. 2 is an exploded perspective view of a lithium secondary battery according to an embodiment.

FIG. 2 is an exploded perspective view of a lithium secondary battery 100 according to another exemplary embodiment. Although the lithium secondary battery 100 illustrated in FIG. 2 is cylindrical, the shape of this embodiment is not limited thereto. Lithium secondary batteries according to this embodiment may be of a rectangular type or a pouch type.

According to the type of separator and/or electrolyte included therein, lithium batteries may be classified as lithium ion batteries, lithium ion polymer batteries, or lithium polymer batteries. According to the shape thereof, lithium batteries may be classified as a cylindrical type, rectangular type, coin type, or pouch type. Furthermore, according to the size thereof, lithium batteries may also be classified as either a bulk type or thin film type. Lithium secondary batteries may have any appropriate shape. The structure of a lithium secondary battery and a method of manufacturing the same are known in the art, so a detailed description thereof will not be recited here.

Referring to FIG. 2, the lithium secondary battery 100, which is cylindrical, includes an anode 112, a cathode 114, a separator 113 disposed between the anode 112 and the cathode 114, and an electrolyte (not shown) impregnated into the anode 112, the cathode 114, and the separator 113, a battery case 120, and a sealing member 140 sealing the battery case 120. The lithium secondary battery 100 is manufactured by sequentially stacking the anode 112, the cathode 114, and the separator 113 on one another, rolling the resultant stack in a spiral form, and accommodating the rolled up stack in the battery case 120.

The anode 112 includes a current collector and an anode active material layer disposed on the current collector. The anode active material layer includes an anode active material. The current collector may be at least one material selected from among a copper foil, a nickel foil, a stainless steel foil, a titanium foil, a nickel foam, a copper foam, a polymeric substrate coated with a conductive metal, and a combination thereof.

The anode active material is not specifically limited, and any anode active material commonly used in the art may be used. Examples of the anode active material include lithium metal, a metal that is alloyable with lithium, a transition metal oxide, a material that allows doping or undoping of lithium, a material that allows reversible intercalation and deintercalation of lithium ions, and the like.

Examples of the transition metal oxide include vanadium oxide, lithium vanadium oxide, and the like. Examples of the material that allows doping or undoping of lithium include silicon (Si), $SiO_x$ wherein $0<x<2$, an Si-T alloy wherein T is an alkali metal, an alkali earth metal, a Group XIII element, a Group XIV element, a transition metal, a rare earth element, or combinations thereof (except for Si), Sn, $SnO_2$, an Sn—Z alloy wherein Z is an alkali metal, an alkali earth metal, a Group XIII element, a Group XIV element, a transition metal, a rare earth element, or a combination thereof (except for Sn), and combinations of at least one of these materials and $SiO_2$. T and Z may each be magnesium (Mg), calcium (Ca), strontium (Sr), barium (Ba), candium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Ru), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), or combinations thereof.

The material that allows reversible intercalation and deintercalation of lithium ions may be any carbonaceous anode active material that is commonly used in a lithium ion secondary battery. Examples of this material include crystalline carbon, amorphous carbon, and combinations thereof. Examples of the crystalline carbon include graphite, such as natural graphite or artificial graphite that are in amorphous, plate, flake, spherical or fibrous form. Examples of the amorphous carbon include soft carbon (carbon sintered at low temperatures), hard carbon, meso-phase pitch carbides, sintered corks, and the like.

The anode active material layer may include a binder, and optionally, a conducting agent. The binder strongly binds anode active material particles together and to a current collector. Examples of the binder include, but not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used to provide conductivity to the anode. Any electron conducting material that does not induce a chemical change in batteries may be used. Examples of the conducting agent include natural graphite, artificial graphite, carbon black, acetylene black, ketjen black, carbon fibers, a metal powder or metal fiber of copper (Cu), nickel (Ni), aluminum (Al), silver (Ag), and the like. The conductive materials, such as a polyphenylene derivative may be added to the above conducting agents.

The cathode 114 includes a current collector and a cathode active material layer disposed on the current collector. Aluminum may be used as the current collector, but the present embodiments are not limited thereto.

The cathode active material is not specifically limited, and may be any cathode active material commonly used in the art. For example, a compound that allows reversible intercalation and deintercalation of lithium may be used. The cathode active material may include at least one composite oxide of lithium and a metal selected from among cobalt (Co), manganese (Mn), nickel (Ni), iron (Fe), and a combination thereof. Examples of the cathode active material include $LiCoO_2$, $LiNi_{1-x}Co_xO_2(0 \leq x<1)$, $Li_{1-x}M_xO_2$ (wherein M is Mn or Fe, $0.03<x<0.1$), $Li[Ni_xCo_{1-2x}Mn_x]O_2(0<x\leq0.5)$, $Li[Ni_xMn_x]O_2(0<x\leq0.5)$, $Li_{1+x}(Ni,Co,Mn)_{1-y}O_z(0<x\leq1, 0\leq y<1, 2\leq z\leq4)$, $LiM_2O_4$ (wherein M is Ti, V, or Mn), $LiM_xMn_{2-x}O_4$ (wherein M is a transition metal, and $0<x<1$), and $LiFePO_4$, $LiMPO_4$ (wherein M is Mn, Co, or Ni). In some embodiments, vanadium oxides and derivatives thereof may be used. Non-limiting examples of these materials include $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, and $Cr_xV_6O_{13}$. Examples of the cathode active material further include $M_2(XO_4)_3$ (wherein M is a transition metal, and X is S, P, As, Mo, W, or the like), $Li_3M_2(PO_4)_3$ (wherein M is Fe, V, Ti, or the like), and $Li_2MSiO_4$ (wherein M is Fe or Mn).

Other examples of the cathode active material include $LiMn_2O_4$, $LiNi_2O_4$, $LiCoO_2$, $LiNiO_2$, $LiMnO_2$, $Li_2MnO_3$, $LiFePO_4$, $Li_{1+x}(Ni,Co,Mn)_{1-x}O_2(0.05\leq x\leq0.2)$, and $LiNi_{0.5}Mn_{1.5}O_4$. The compounds listed above as cathode active materials may have a surface coating layer (hereinafter, "coating layer"). In another embodiment, a mixture of a compound without a coating layer and a compound having a coating layer, the compounds being selected from the compounds listed above, may be used. The coating layer may include at least one anion of a coating element selected from among oxide, hydroxide, oxyhydroxide, oxycarbonate, and hydroxycarbonate of the coating element. The compounds for forming the coating layer may be amorphous or crystalline. The coating cation for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the properties of the cathode active material when a compound of the coating element is used. For example, the coating layer may be formed using a spray coating method, a dipping method, or the like. These materials will be known to those of ordinary skill in the art, and thus a detailed description need not be repeated herein. The cathode active material may have an operating voltage of about 4.9 V or greater, for example, 5 V.

The cathode active material layer may include a binder and a conducting agent. The binder strongly binds cathode active material particles together and to a current collector. Examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber (SBR), acrylated SBR, epoxy resin, and nylon.

The conducting agent is used to provide conductivity to the cathode. Any electron conducting material that does not induce a chemical change in batteries may be used. Examples of the conducting agent include natural graphite, artificial graphite, carbon black, acetylene black, ketjen black, carbon fibers, and metallic materials, including copper, nickel, aluminum, and silver, in powder or fiber form. One or more of the conducting materials such as polyphenylene derivatives may be added to the above conducting agents.

The amounts of the cathode active material, the binder, and the conducting agent may be equivalent to those commonly used in lithium batteries. For example, a weight ratio of the cathode active material to a mixture of the conducting agent and the binder may be from about 98:2 to about 92:8. A mixing ratio of the conducting agent to the binder may be, but is not limited to, from about 1:1.5 to about 1:3.

The anode 112 and the cathode 114 may each be manufactured by mixing an active material, a conducting agent, and a binder in a solvent to prepare an active material composition, and coating the active material composition onto a current collector.

The method of manufacturing the electrodes will be known to one of ordinary skill in the art, and thus a detailed description need not be repeated herein. N-methylpyrrolidione may be used as the solvent, but the present embodiments are not limited thereto.

A separator 113 may be disposed between the cathode 114 and the anode 112, according to the type of the lithium battery. The separator may include polyethylene, polypropylene, polyvinylidene fluoride (PVDF), or a multi-layer of at least two thereof. Examples of the separator include mixed multi-layer separators, including a polyethylene/polypropylene double-layer separator, polyethylene/polypropylene/polyethylene triple-layer separator, and a polypropylene/polyethylene/polypropylene triple-layer separator.

Hereinafter, one or more embodiments of the present invention will be described in detail with reference to the following examples. These examples are for illustrative purposes only and are not intended to limit the purpose and scope of the one or more embodiments of the present invention. Technical descriptions that are known to those of ordinary skill in the art will be omitted herein.

Example 1

Preparation of Electrolyte for Lithium Secondary Battery 0.1 wt % of additive vitamin $B_3$ (niacinamide) was added to a mixed organic solvent including 30 vol % of ethylene carbonate (EC), 50 vol % of diethyl carbonate (DEC), and 20 vol % of ethylmethyl carbonate (EMC), and 1.3 M LiPF$_5$ was used as a lithium salt, to prepare an electrolyte for a lithium secondary battery.

Example 2

Preparation of Electrolyte for Lithium Secondary Battery

An electrolyte for a lithium secondary battery was prepared in the same manner as in Example 1, except that 0.05 wt % of vitamin B$_4$ (adenine), instead of vitamin B$_3$ (niacinamide), was used as the additive.

Example 3

Preparation of Electrolyte for Lithium Secondary Battery

An electrolyte for a lithium secondary battery was prepared in the same manner as in Example 1, except that 0.1 wt % of vitamin D$_2$ (ergocalciferol), instead of vitamin B$_3$ (niacinamide), was used as the additive.

Example 4

Preparation of Electrolyte for Lithium Secondary Battery

An electrolyte for a lithium secondary battery was prepared in the same manner as in Example 1, except that 0.1 wt % of vitamin D$_3$ (cholecalciferol), instead of vitamin B$_3$ (niacinamide), was used as the additive.

Example 5

Preparation of Electrolyte for Lithium Secondary Battery

An electrolyte for a lithium secondary battery was prepared in the same manner as in Example 1, except that 0.05 wt % of vitamin G (vitamin B$_2$, riboflavin), instead of vitamin B$_3$ (niacinamide), was used as the additive.

Example 6

Preparation of Electrolyte for Lithium Secondary Battery

An electrolyte for a lithium secondary battery was prepared in the same manner as in Example 1, except that 0.1 wt % of vitamin H (vitamin B$_7$, biotin), instead of vitamin B$_3$ (niacinamide), was used as the additive.

Example 7

Preparation of Electrolyte for Lithium Secondary Battery

An electrolyte for a lithium secondary battery was prepared in the same manner as in Example 1, except that 0.1 wt % of vitamin K$_1$ (phylloquinone), instead of vitamin B$_3$ (niacinamide), was used as the additive.

Example 8

Preparation of Electrolyte for Lithium Secondary Battery

An electrolyte for a lithium secondary battery was prepared in the same manner as in Example 1, except that 0.05 wt % of ascorbyl palmitate (vitamin C ester), instead of vitamin B$_3$ (niacinamide), was used as the additive.

Example 9

Preparation of Electrolyte for Lithium Secondary Battery

An electrolyte for a lithium secondary battery was prepared in the same manner as in Example 1, except that 0.1 wt % of sodium ascorbate, instead of vitamin B$_3$ (niacinamide), was used as the additive.

Comparative Example 1

Preparation of Electrolyte for Lithium Secondary Battery

A mixed organic solvent including 30 vol % of ethylene carbonate (EC), 50 vol % of diethyl carbonate (DEC), and 20 vol % of ethylmethyl carbonate (EMC), and 1.3 M LiPF$_6$ as a lithium salt were used without an extra additive, to prepare an electrolyte for a lithium secondary battery.

Example 10

Manufacture of Lithium Polymer Battery

Li$_{1+x}$(Ni,Co,Mn)$_{1-x}$O$_2$ (0.05≤x≤0.2) powder as a cathode active material, 5 wt % of polyvinylidene fluoride (PVdF) dissolved in N-methylpyrrolidone (NMP) as a binder, and a conducting agent (Denka black) were mixed at a weight ratio of 92:4:4 to prepare a slurry. The slurry was coated onto an aluminum foil having a thickness of 15 μm. The aluminum foil coated with the slurry was dried in a 90° C. oven for about 2 hours (first drying), and then in a 120° C. vacuum oven for about 2 hours (second drying) until the NMP was completely evaporated. The resulting electrode was subjected to rolling and punching to obtain a coin cell type cathode having a diameter of about 1.5 cm and a thickness of about 50 μm to about 60 μm. The cathode had a capacity of about 1.7 mAh/cm$^2$.

The cathode, a graphite anode, a polyethylene separator, and the electrolyte prepared in Example 1 were used to manufacture a standard coin cell.

Example 11

Manufacture of Lithium Secondary Battery

A lithium secondary battery was manufactured in the same manner as in Example 10, except that the electrolyte of Example 2 was used.

Example 12

Manufacture of Lithium Secondary Battery

A lithium secondary battery was manufactured in the same manner as in Example 10, except that the electrolyte of Example 3 was used.

Example 13

Manufacture of Lithium Secondary Battery

A lithium secondary battery was manufactured in the same manner as in Example 10, except that the electrolyte of Example 4 was used.

Example 14

Manufacture of Lithium Secondary Battery

A lithium secondary battery was manufactured in the same manner as in Example 10, except that the electrolyte of Example 5 was used.

Example 15

Manufacture of Lithium Secondary Battery

A lithium secondary battery was manufactured in the same manner as in Example 10, except that the electrolyte of Example 6 was used.

Example 16

Manufacture of Lithium Secondary Battery

A lithium secondary battery was manufactured in the same manner as in Example 10, except that the electrolyte of Example 7 was used.

Example 17

Manufacture of Lithium Secondary Battery

A lithium secondary battery was manufactured in the same manner as in Example 10, except that the electrolyte of Example 8 was used.

Example 18

Manufacture of Lithium Secondary Battery

A lithium secondary battery was manufactured in the same manner as in Example 10, except that the electrolyte of Example 9 was used.

Comparative Example 2

Manufacture of Lithium Secondary Battery

A lithium secondary battery was manufactured in the same manner as in Example 10, except that the electrolyte of Comparative Example 1 was used.

Example 19

Manufacture of Lithium Secondary Battery $LiNi_{0.5}Mn_{1.5}O_4$ powder as a cathode active material, 5 wt % of polyvinylidene fluoride (PVdF) dissolved in N-methylpyrrolidone (NMP) as a binder, and a conducting agent (Denka black) were mixed at a weight ratio of 92:4:4 to prepare a slurry. The slurry was coated onto an aluminum foil having a thickness of 15 μm. The aluminum foil coated with the slurry was dried in a 90° C. oven for about 2 hours (first drying), and then in a 120° C. vacuum oven for about 2 hours (second drying) until the NMP was completely evaporated. The resulting electrode was subjected to rolling and punching to obtain a coin cell type cathode having a diameter of about 1.5 cm and a thickness of about 50 μm to about 60 μm. The cathode had a capacity of about 1.0 $mAh/cm^2$.

The cathode, a lithium metal anode, a polyethylene separator, and the electrolyte prepared in Example 1 were used to manufacture a standard coin cell.

Example 20

Manufacture of Lithium Secondary Battery

A lithium secondary battery was manufactured in the same manner as in Example 19, except that the electrolyte of Example 2 was used.

Example 21

Manufacture of Lithium Secondary Battery

A lithium secondary battery was manufactured in the same manner as in Example 19, except that the electrolyte of Example 6 was used.

Comparative Example 3

Manufacture of Lithium Secondary Battery

A lithium secondary battery was manufactured in the same manner as in Example 19, except that the electrolyte of Comparative Example 1 was used.

Experimental Example

Test of Charge and Discharge Characteristics of Lithium Secondary Battery

Tests to measure formation charge/discharge characteristics, standard charge/discharge characteristics, lifetime characteristics, and high-temperature preservation characteristics were performed on the coin cells manufactured in Examples 10-18 and Comparative Example 2.

Formation Charging/Discharging

Formation charging/discharging was performed twice on the coin cells of Examples 10-18 and Comparative Examples 2 and 3 at room temperature.

In the first formation process, constant-current charging was performed on each of the coin cells at 0.2 C to a voltage of 4.4 V, followed by constant-voltage charging to a 0.05 C current. Next, constant-current discharging was performed at 0.2 C to a voltage of 2.8 V. A second formation process was performed in the same manner as in the first formation process.

The term "1C charging" refers to charging for 1 hour to reach the capacity of a battery in mAh. Likewise, the term "1C discharging" refers to discharging for 1 hour to fully discharge the capacity of the battery in mAh.

Standard Charging/Discharging

After the formation charging and discharging, each of the batteries was charged at 0.5 C to 4.4 V, and then discharged at 0.2 C to 2.8 V. These charging and discharging conditions are termed "standard charging and discharging conditions", and the discharge capacity under these conditions was defined as a "standard capacity". The measured standard capacities ranged from about 3.2 mAh to about 3.5 mAh.

Thin Film Image

Figure 3:
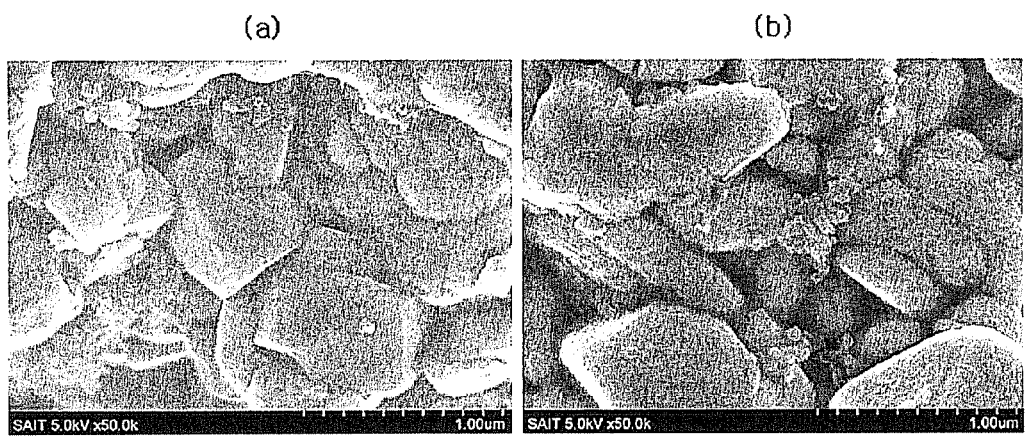
FIG. 3 shows scanning electron microscopic (SEM) images respectively before and after a thin film was formed on a surface of the cathode of the lithium secondary battery of Example 14.

FIG. 3 shows scanning electron microscopic (SEM) images respectively before and after a thin film was formed on a surface of a cathode of the lithium secondary battery of Example 14. In particular, image 3(a) is a SEM image before the formation charging is performed on the cathode of the lithium secondary battery of Example 14 using vitamin G (vitamin $B_2$, riboflavin) as the additive, and image 3(b) is a SEM image after the formation charging is performed on the cathode of the lithium secondary battery of Example 14. Referring to FIG. 3, the surface of cathode particles before the formation charging are seen to be smooth, whereas the surface of the cathode particles after the formation charging are seen to be covered with small particles. This may be attributed to the formation charging causing the surface of the cathode to be covered with a thin film.

Lifetime Characteristics: High-temperature Cycle Capacity Retention Ratio (%)

Charging was performed on the lithium secondary batteries of Examples 10-18 and Comparative Example 2 in a 60° C. constant-temperature chamber at 1 C to 4.4 V, followed by discharging at 1 C to 2.8 V. Then, a discharge capacity (discharge capacity after the $1^{st}$ cycle) was measured. Cycles of 1 C charging and 1 C discharging were repeated in the 60° C. chamber while measuring a discharge capacity after each of the cycles. A cycle retention ratio was calculated using the discharge capacity from each of the cycles. The cycle retention was calculated using Equation 1 below.

$$\text{Cycle retention ratio (\%)} = 100 * n^{th} \text{ cycle discharge capacity}/1^{st} \text{ cycle discharge capacity} \quad [\text{Equation 1}]$$

Figure 4A:
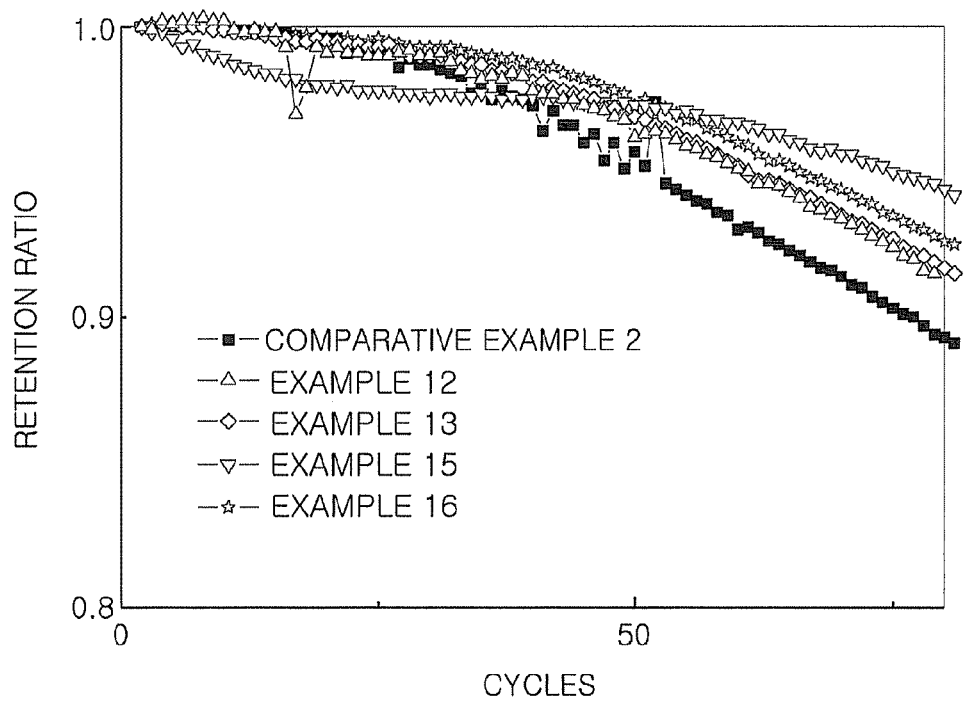
FIG. 4A and FIG. 4B are graphs of cycle retention at high temperature with respect to the number of cycles in lithium second batteries of Comparative Example 2 and Examples 10-18.
Figure 4B:
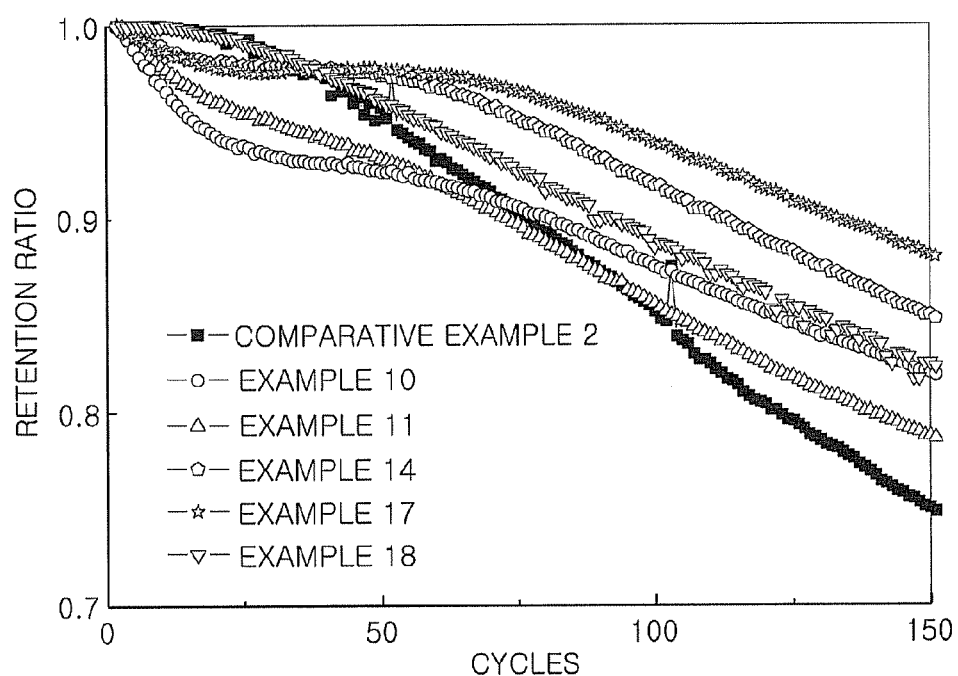

FIG. 4A and FIG. 4B are graphs of cycle retention ratio at high temperature with respect to the number of cycles, which graph was obtained using the method described above. Charging and discharging cycles were performed 80 times on the lithium secondary batteries of Examples 12, 13, 15, and 16, and 150 times on those of Examples 10, 11, 14, 17, and 18.

Referring to FIG. 4A and FIG. 4B, although similar to the cycle retention ratio of the lithium secondary battery of Comparative Example 2 up to about 40 cycles, the curves of cycle retention ratios of the lithium secondary batteries of Examples 12 to 18, beyond about 40 cycles, crossed over the curve for Comparative Example 2 and then stayed higher than the curve of the cycle retention of the lithium secondary battery from Comparative Example 2 as the number of cycles increased. FIG. 4A and FIG. 4B show that the greater the cycle number, the greater the difference in cycle retention ratio between Comparative Example 2 and the other examples according to the present invention.

In the lithium secondary battery of Example 10, the curve of the cycle retention ratio was lower up to about 70 cycles than that of Comparative Example 2, but, beyond about 70 cycles, crossed over the curve for Comparative Example 2 and then stayed higher than the curve of the cycle retention of the lithium secondary battery from Comparative Example 2 as the number of cycles increased. In the lithium secondary battery of Example 11, the cycle retention ratio was lower up to about 70 cycles than that of Comparative Example 2, was similar to that of Comparative Example 2 between about 70 cycles and about 100 cycles, and, beyond about 100 cycles, crossed over the curve for Comparative Example 2 and then stayed higher than the curve of the cycle retention of the lithium secondary battery from Comparative Example 2 with the increasing number of cycles.

These results indicate that the lithium secondary batteries of Examples 10-18 have better high-temperature cycle retention ratio, i.e., better lifetime characteristics, than the lithium secondary battery of Comparative Example 2. This is due to the use of the additive that decomposed forming a stable thin film on the surface of the cathode.

High-Temperature Storage Characteristics I: High-Temperature Retention Ratio (%)

Formation charging and discharging were performed twice and standard charging and discharging were performed once on the lithium secondary batteries of Examples 19, 20 and 21 and Comparative Example 3, and was followed by performing charging under standard conditions, i.e., at 0.5 C, and leaving batteries at a temperature of about 90° C. for about 20 hours. Discharge capacities (discharge capacities after being left at high-temperatures) of the lithium batteries were measured, and high-temperature retention ratios were calculated using the measured discharge capacities. An optical circuit voltage (OCV) before and after being left at high temperatures was measured.

The high-temperature retention ratio was calculated using Equation 2 below.

$$\text{High-temperature retention ratio (\%)} = 100 * \text{Discharge capacity after being left at high temperature}/\text{Standard discharge capacity} \quad [\text{Equation 2}]$$

Figure 5:
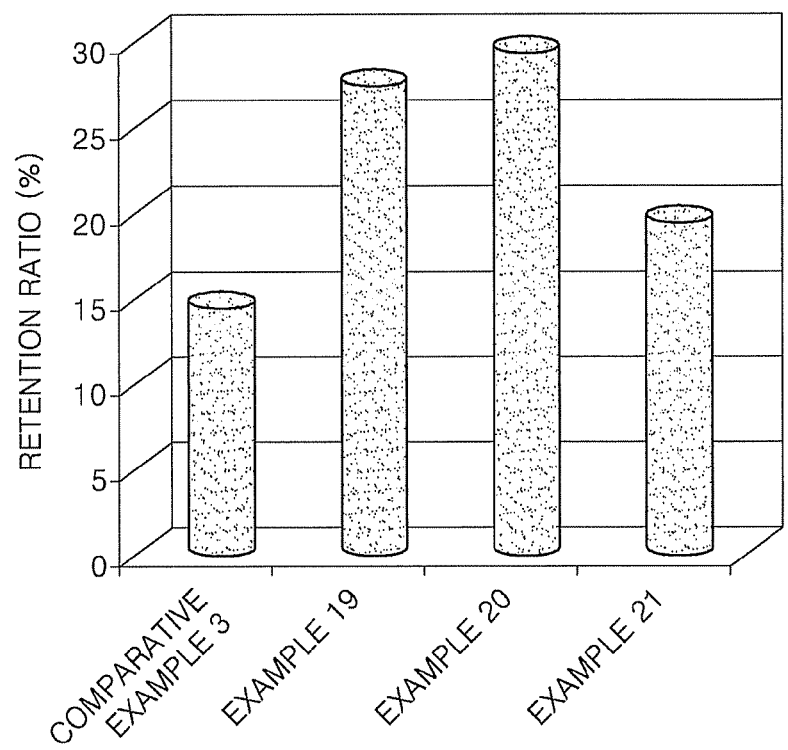
FIG. 5 is a graph of cycle retention in lithium secondary batteries of Comparative Example 3 and Examples 19-21 after being maintained at a high temperature.

Table 1 shows the high-temperature retention ratios calculated using the method described above. FIG. 5 is a graph of the high-temperature retention ratios calculated using the method.

TABLE 1

|  | Example 19 | Example 20 | Example 21 | Comparative Example 3 |
|---|---|---|---|---|
| Standard discharge capacity (mAh) | 1.784 | 1.816 | 1.827 | 1.845 |
| Discharge capacity after being left at high temperature (mAh) | 0.490 | 0.534 | 0.358 | 0.270 |
| High-temperature cycle retention (%) | 27.5 | 29.4 | 19.6 | 14.6 |

Referring to Table 1 and FIG. 5, after being left at 90° C. for about 4 hours, the retention ratio of the lithium secondary battery of Comparative Example 3 was less than about 15%, while those of the lithium secondary batteries of Examples 19 and 20 were greater than about 25%, and the retention ratio of the lithium secondary battery of Example 21 was greater than about 15%. The results in Table 1 and FIG. 5 indicate that the lithium secondary batteries according to the embodiments of the present invention have higher high-temperature retention ratios than the lithium secondary battery of Comparative Example 3. This is considered to be due to the stable thin film formed on the surface of the cathode.

Figure 6:
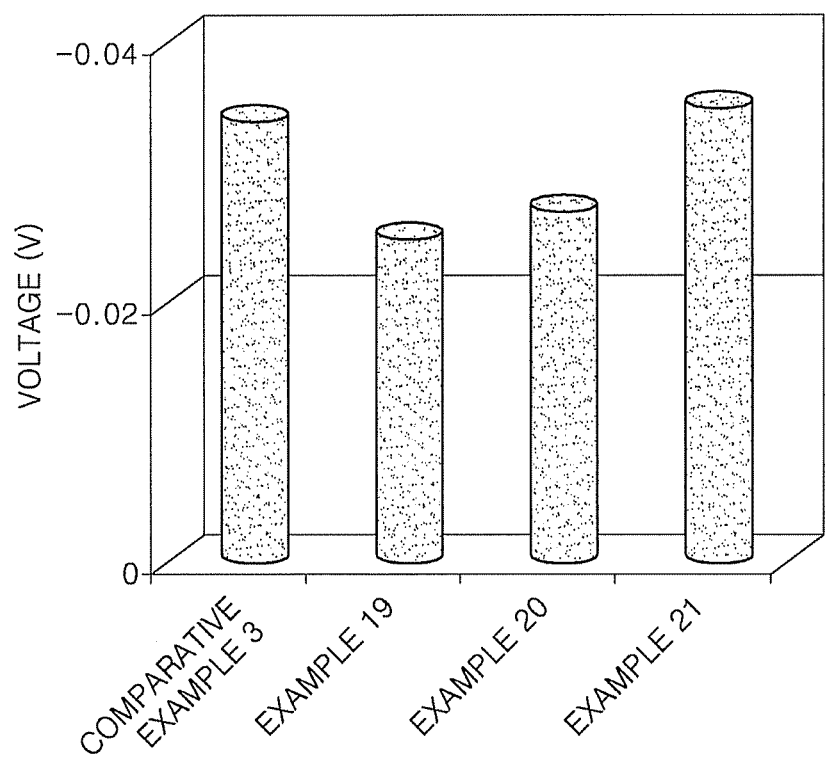
FIG. 6 is a graph of open circuit voltages (OCVs) in the lithium secondary batteries of Comparative Example 3 and Examples 19-21 after being maintained at a high temperature.

Table 2 shows the open circuit voltages (OCVs) before and after the batteries were left at high temperatures. FIG. 6 is a graph of the open circuit voltages (OCVs) before and after being left at high temperatures.

TABLE 2

|  | Example 19 | Example 20 | Example 21 | Comparative Example 3 |
|---|---|---|---|---|
| OCV before being left at high temperature (V) | 4.736 | 4.738 | 4.743 | 4.740 |
| OCV after being left at high temperature (V) | 4.711 | 4.711 | 4.708 | 4.706 |
| ΔV (V) | −0.025 | −0.027 | −0.035 | −0.034 |

Referring to Table 2 and FIG. 6, after the batteries were left at 90° C. for about 20 hours, the open circuit voltage (OCV) of the lithium secondary battery of Comparative Example 3 decreased to less than about 0.03 V, while those of the lithium secondary batteries of Examples 19 and 20 decreased to greater than about 0.03 V, and the OCV of the lithium secondary battery of Example 21 decreased to greater than about 0.03.

The results in Table 2 and FIG. 6 indicate that the lithium secondary batteries according to the embodiments of the present invention have improved OCV characteristics after being left at high temperatures.

High-Temperature Characteristics II: High-Temperature Efficiency (%)

After formation charging and discharging were performed twice and standard charging and discharging were performed once on the lithium secondary batteries of Examples 19, 20 and 21 and Comparative Example 3, the lithium secondary batteries were left at a temperature of about 90° C. for about 20 hours, followed by twice performing standard charging and discharging. A high-temperature efficiency of each of the lithium secondary batteries was measured before and after being left at the temperature of about 90° C. for about 20 hours.

The high-temperature preservation efficiency is measured as a percentage of discharge capacity to charge capacity for a specific cycle number, using Equation 3 below.

Efficiency 1 before being left at high temperature
(%)=100*($1^{st}$ Formation discharge capacity)/($1^{st}$ Formation charge capacity)

Efficiency 2 before being left at high temperature
(%)=100*($1^{st}$ Standard discharge capacity)/($1^{st}$ Standard charge capacity)  [Equation 3]

Figure 7:
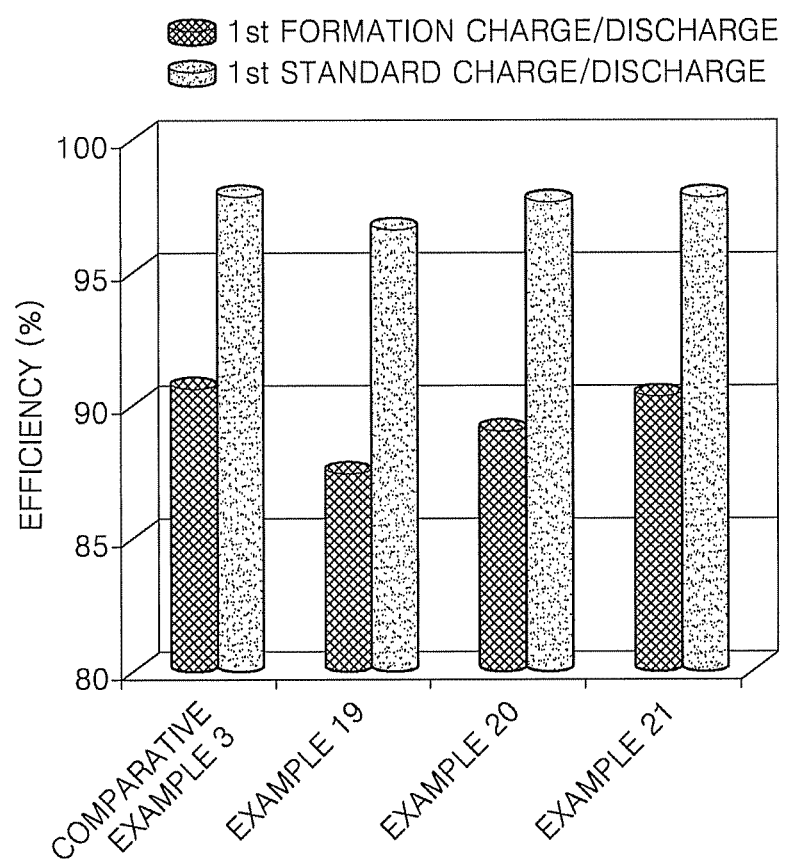
FIG. 7 is a graph of $1^{st}$ formation charge/discharge efficiencies and $1^{st}$ standard charge/discharge efficiencies of the lithium secondary batteries of Comparative Example 3 and Examples 19-21.

Table 3 shows the $1^{st}$ formation charge/discharge efficiencies and $1^{st}$ standard charge/discharge efficiencies of the lithium secondary batteries of Examples 19-21 and Comparative Example 3 before the lithium secondary batteries were left at a high temperature. FIG. 7 is a graph of these $1^{st}$ formation charge/discharge efficiencies and $1^{st}$ standard charge/discharge efficiencies.

TABLE 3

|  | Example 19 | Example 20 | Example 21 | Comparative Example 3 |
|---|---|---|---|---|
| $1^{st}$ Formation charge capacity before being left at high temperature (mAh) | 2.004 | 2.027 | 2.052 | 2.029 |
| $1^{st}$ Formation discharge capacity before being left at high temperature (mAh) | 1.752 | 1.804 | 1.853 | 1.838 |
| $1^{st}$ Formation charge/discharge efficiency before being left at high temperature (%) | 87.4 | 89.0 | 90.3 | 90.6 |
| $1^{st}$ Standard charge capacity before being left at high temperature (mAh) | 1.847 | 1.861 | 1.867 | 1.886 |
| $1^{st}$ Standard discharge capacity before being left at high temperature (mAh) | 1.784 | 1.816 | 1.827 | 1.845 |
| $1^{st}$ Standard charge/discharge efficiency before being left at high temperature (%) | 96.6 | 97.6 | 97.9 | 97.8 |

Figure 8:
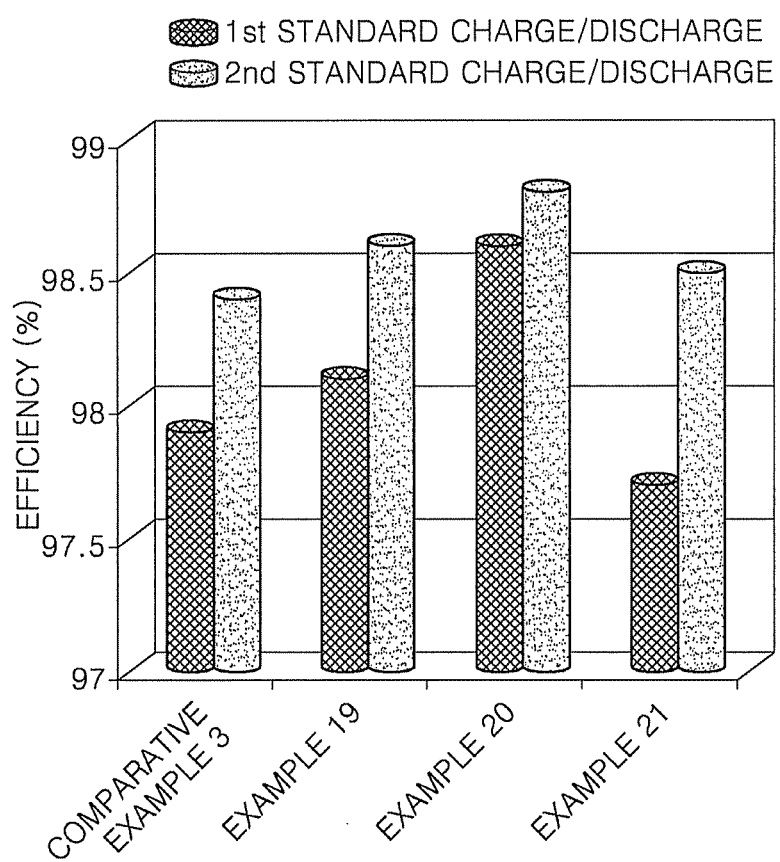
FIG. 8 is a graph of $1^{st}$ standard charge/discharge efficiencies and $2^{nd}$ standard charge/discharge efficiencies in the lithium secondary batteries of Comparative Example 3 and Examples 19-21 after being left at a high temperature.

Table 4 shows the $1^{st}$ standard charge/discharge efficiencies and $2^{nd}$ standard charge/discharge efficiencies of the lithium secondary batteries of Examples 19-21 and Comparative Example 3 after the lithium secondary batteries were left at high temperatures. FIG. 8 is a graph of these $1^{st}$ standard charge/discharge efficiencies and $2^{nd}$ standard charge/discharge efficiencies.

TABLE 4

|  | Example 19 | Example 20 | Example 21 | Comparative Example 3 |
|---|---|---|---|---|
| $1^{st}$ Standard charge capacity after being left at high temperature (mAh) | 1.780 | 1.787 | 1.821 | 1.850 |
| $1^{st}$ Standard discharge capacity after being left at high temperature (mAh) | 1.747 | 1.762 | 1.779 | 1.811 |
| $1^{st}$ Standard charge/discharge efficiency after being left at high temperature (%) | 98.1 | 98.6 | 97.7 | 97.9 |
| $2^{nd}$ Standard discharge capacity after being left at high temperature (mAh) | 1.769 | 1.793 | 1.812 | 1.839 |
| $2^{nd}$ Standard discharge capacity after being left at high temperature (mAh) | 1.744 | 1.771 | 1.784 | 1.811 |
| $2^{nd}$ Standard charge/discharge efficiency after being left at high temperature (%) | 98.6 | 98.8 | 98.5 | 98.4 |

Referring to Table 3 and FIG. 7, which show the charge/discharge efficiencies before the secondary lithium batteries were left at high temperatures, the lithium secondary batteries of Comparative Example 3 and Example 21 had a higher $1^{st}$ formation charge/discharge efficiency than those of Examples 19 and 20. However, the $1^{st}$ standard charge/discharge efficiencies were similar in the lithium batteries of Examples 19-20 and Comparative Example 3.

The lower $1^{st}$ formation charge/discharge efficiency compared to the $1^{st}$ standard charge/discharge efficiency is due to the irreversible formation of a thin film on the surface of the electrode during the first charging of the lithium secondary battery. The lower $1^{st}$ formation charge/discharge efficiencies of the lithium secondary batteries of Examples 19 and 20 compared to the lithium secondary battery of Comparative Example 3 is considered to be due to the electrolytes used in the lithium secondary batteries of Examples 19 and 20 causing a thin film to form on the surface of their cathode, thus lowering conductivity of the electrolytes. The similar $1^{st}$ standard charge/discharge efficiencies before being left at high temperatures between Examples 19 and 20 and Comparative Example 3 is considered to be due to the stabilization of the lithium secondary batteries of Examples 19 and 20 with the complete formation of the thin film on the cathodes of the lithium batteries of Examples 19 and 20.

Referring to Table 4 and FIG. 8, which show the standard charge/discharge efficiencies after the secondary lithium batteries were left at high temperatures, the $1^{st}$ standard charge/discharge efficiency after being left at a high temperature was highest in the lithium secondary battery of Example 20, and second highest in the lithium secondary battery of Example 19, while lowest in the lithium secondary batteries of Comparative Examples 3 and Example 21. The $2^{nd}$ standard charge/discharge efficiency after being left at high temperatures was highest in the order of the lithium secondary batteries of Example 20, Example 19, and Example 21, while lowest in the lithium secondary battery of Comparative Example 3. The $2^{nd}$ standard charge/discharge efficiency after being left at a high temperature was higher than the $1^{st}$ standard charge/discharge efficiency after being left at a high temperature in all of the tested lithium secondary batteries.

The charge/discharge efficiencies after being left at high temperatures in the lithium secondary batteries of Examples 19 and 20 were greater than those of Comparative Example 3 and this is attributed to the thin film that was formed during a first charging becoming stabilized so less decomposition occurs when the batteries are left at a high temperature, thus inhibiting further decomposition of the electrolyte that forms additional thin films. The $2^{nd}$ charge/discharge efficiencies, after the batteries were left at high temperatures, are greater than the first charge/discharge efficiencies after the batteries were left at high temperatures in every tested lithium secondary battery and this is attributed to the thin film being formed from the electrolyte to some extent during the $1^{st}$ charging, thus inhibiting further decomposition of the electrolyte during the $2^{nd}$ charging and discharging.

According to the above-described embodiments, the lithium secondary battery includes a thin film on a surface of the cathode, which is formed from an electrolyte during initial charging and discharging to block a cathode active material from directly contacting the electrolyte. The thin film does not allow electrons to pass through, protecting the electrolyte from becoming oxidized by loss of electrons to the cathode under high-temperature and high-voltage conditions. Furthermore, the additive itself may prevent decomposition of the electrolyte in high-temperature and high-voltage environments. The prevention of the electrolyte loss under high-temperature and high-voltage conditions may ensure the lithium secondary battery retains high capacity and efficiency, and thus has a longer lifespan.

The improvement in lifespan characteristics enables the lithium secondary batteries according to the above-described embodiments to normally operate in extreme environments when used in electric vehicles, and the improvement in high-temperature preservation characteristics may further enable the lithium secondary batteries to be used in power storage facilities that are likely to be exposed to high-temperatures. The lithium secondary battery is predicted to be used along with a cathode active material to which a very high voltage is applied, for example, a 5 V spinel, or a high-voltage phosphate cathode active material, which may play an important part in improving the energy density of batteries for electric vehicles and power storage facilities.

As described above, according to the one or more of the above embodiments of the present invention, a lithium secondary battery may include an electrolyte containing a vitamin additive that may be oxidized, instead of the electrolyte, to form a thin film on a surface of a cathode, which may improve lifetime characteristics and high-temperature preservation characteristics of the lithium secondary battery.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte for a lithium secondary battery, the electrolyte comprising: a lithium salt; a nonaqueous organic solvent; and at least one additive selected from the group consisting of vitamin G (vitamin B2, riboflavin), vitamin B4 (adenine), vitamin B5 (pantothenic acid), vitamin H (vitamin B7, biotin), vitamin M (vitamin B9, folic acid), vitamin D2 (ergocalciferol), vitamin D3 (cholecalciferol), vitamin K1 (phylloquinone), and ascorbyl palmitate, wherein the amount of the at least one additive is in a range of about 0.005 wt % to about 5 wt % based on the total weight of the electrolyte, wherein the electrolyte is devoid of vitamin B6.

2. The electrolyte of claim 1, wherein the at least one additive is at least one substituent selected from the group consisting of an alkyl group, an alkoxy group, an ethylene oxide group, an alkylthio group, an ether group, an ester group, a hydroxyl group, an amine group, a thiol group, a ketone group, an epoxy group, a fluoro group, a chloro group, and a bromo group.

3. The electrolyte of claim 1, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_yF_{2y+1}SO_2)$ (where x and y are each a natural number), LiF, LiBr, LiCl, LiI, LiB $(C_2O_4)_2$ (lithium bis(oxalato) borate or LiBOB), or a combination thereof.

4. The electrolyte of claim 1, wherein the nonaqueous organic solvent comprises a carbonate-based solvent, an ester-based solvent, an ether-based solvent, a ketone-based solvent, an alcohol-based solvent, an aprotic solvent, or a combination thereof.

5. A lithium secondary battery comprising: a cathode including a cathode active material that allows intercalation and deintercalation of lithium; an anode including an anode active material that allows intercalation and deintercalation of lithium; and an electrolyte filled between the cathode and the anode, wherein the electrolyte comprises a lithium salt, a nonaqueous organic solvent, and at least one additive selected from the group consisting of vitamin G (vitamin B2, riboflavin), vitamin B4 (adenine), vitamin B5 (pantothenic acid), vitamin H (vitamin B7, biotin), vitamin M (vitamin B9, folic acid), vitamin D2 (ergocalciferol), vitamin D3 (cholecalciferol), vitamin K1 (phylloquinone), ascorbyl palmitate, and sodium ascorbate, wherein the amount of the at least one additive is in a range of about 0.005 wt % to about 5 wt % based on the total weight of the electrolyte, wherein the electrolyte is devoid of vitamin B6.

6. The lithium secondary battery of claim 5, wherein the cathode comprises a thin film on a surface thereof, the thin film formed by partial or total oxidation of the additive during initial charging of the lithium secondary battery.

7. The lithium secondary battery of claim 6, wherein the thin film has a thickness of about 0.05 nm to about 100 nm.

8. The lithium secondary battery of claim 5, wherein the cathode active material comprises at least one material selected from the group consisting of $LiCoO_2$, $LiNi_{1-x}Co_xO_2$ ($0 \leq x < 1$), $Li_{1-x}M_xO_2$ (wherein M is Mn or Fe, and $0.03 < x < 0.1$), $Li[Ni_xCo_{1-2x}Mn_x]O_2 (0<x<0.5)$, $Li[Ni_xMn_x]O_2$ ($0<x\leq0.5$), $Li_{1+x}(Ni,Co,Mn)_{1-y}O_z$ ($0<x\leq1$, $0\leq y<1$, and $2\leq z\leq4$), $LiM_2O_4$ (wherein M is Ti, V, or Mn), $LiM_xMn_{2-x}O_4$ (wherein M is a transition metal, and $0<x<1$), $LiFePO_4$, $LiMPO_4$ (wherein M is Mn, Co, or Ni), $V_2O_5$, $V_2O_3$, $VO_2(B)$, $V_6O_{13}$, $V_4O_9$, $V_3O_7$, $Ag_2V_4O_{11}$, $AgVO_3$, $LiV_3O_5$, $\delta$-$Mn_yV_2O_5$, $\delta$-$NH_4V_4O_{10}$, $Mn_{0.8}V_7O_{16}$, $LiV_3O_8$, $Cu_xV_2O_5$, $Cr_xV_6O_{13}$, $M_2(XO_4)_3$ (wherein M is a transition metal, and X is S, P, As, Mo, or W), and $Li_3M_2(PO_4)_3$ (wherein M is Fe, V, or Ti).

9. The lithium secondary battery of claim 8, wherein the cathode active material has an operating voltage of about 5 V.

10. The lithium secondary battery of claim 9, wherein the cathode active material comprises $Li_{1+x}(Ni,Co,Mn)_{1-x}O_2$ ($0.05 \leq x \leq 0.2$) or $LiNi_{0.5}Mn_{1.5}O_4$.

11. The lithium secondary battery of claim 5, wherein the anode active material is at least one material selected from the group consisting of a vanadium oxide, a lithium vanadium oxide, silicon (Si), SiOx ($0<x<2$), a Si-T alloy (wherein T is selected from the group consisting of magnesium (Mg), calcium (Ca), strontium (Sr), barium (Ba), scandium (Sc), yttrium (Y), titanium (Ti), zirconium (Zr), hafnium (Hf), vanadium (V), niobium (Nb), tantalum (Ta), chromium (Cr), molybdenum (Mo), tungsten (W), rhenium (Re), iron (Fe), lead (Pb), ruthenium (Ru), osmium (Os), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), and combinations thereof), graphite, soft carbon, hard carbon, mesophase pitch carbide, and sintered coke.

12. The lithium secondary battery of claim 5, wherein the at least one additive is at least one substituent selected from the group consisting of an alkyl group, an alkoxy group, an ethylene oxide group, an alkylthio group, an ether group, a hydroxyl group, an amine group, a thiol group, a ketone group, an epoxy group, a fluoro group, a chloro group, and a bromo group.

13. The lithium secondary battery of claim 5, wherein the lithium salt comprises $LiPF_6$, $LiBF_4$, $LiSbF_6$, $LiAsF_6$, $LiCF_3SO_3$, $Li(CF_3SO_2)_3C$, $Li(CF_3SO_2)_2N$, $LiC_4F_9SO_3$, $LiClO_4$, $LiAlO_2$, $LiAlCl_4$, $LiBPh_4$, $LiN(C_xF_{2x+1}SO_2)(C_xF_{2y+1}SO_2)$ (where x and y are each a natural number), LiF, LiBr, LiCl, LiI, $LiB(C_2O_4)_2$ (lithium bis(oxalato) borate or LiBOB), or a combination thereof.

14. The lithium secondary battery of claim 5, wherein the nonaqueous organic solvent comprises a carbonate-based solvent, an ester-based solvent, an ether-based solvent, a ketone-based solvent, an alcohol-based solvent, an aprotic solvent, or a combination thereof.

15. The lithium secondary battery of claim 5, further comprising a separator between the cathode and the anode, the separator electrically insulating the cathode and the anode from each other.

\* \* \* \* \*